United States Patent
Morita et al.

(10) Patent No.: US 10,371,838 B2
(45) Date of Patent: Aug. 6, 2019

(54) RADIATION IMAGING APPARATUS, METHOD OF CONTROLLING RADIATION IMAGING APPARATUS, AND NON-TRANSITORY COMPUTER READABLE STORAGE MEDIUM

(71) Applicant: CANON KABUSHIKI KAISHA, Tokyo (JP)

(72) Inventors: Hideaki Morita, Tokyo (JP); Toshiya Ishioka, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/726,467

(22) Filed: Oct. 6, 2017

(65) Prior Publication Data

US 2018/0106914 A1  Apr. 19, 2018

(30) Foreign Application Priority Data

Oct. 14, 2016 (JP) ................. 2016-203029

(51) Int. Cl.
  *G01T 7/12* (2006.01)
  *G01T 1/17* (2006.01)
  *G01T 1/29* (2006.01)
  *H04N 5/32* (2006.01)
  *H04N 5/361* (2011.01)

(52) U.S. Cl.
  CPC ............... *G01T 7/12* (2013.01); *G01T 1/17* (2013.01); *G01T 1/2928* (2013.01); *H04N 5/32* (2013.01); *H04N 5/361* (2013.01)

(58) Field of Classification Search
  CPC ............... A61B 6/42–6/54; G01T 7/12
  USPC ............... 340/600
  See application file for complete search history.

(56) References Cited

U.S. PATENT DOCUMENTS

| 9,814,435 | B2* | 11/2017 | Kim | A61B 6/469 |
| 2010/0054399 | A1* | 3/2010 | Nishino | A61B 6/4233 378/28 |
| 2015/0085980 | A1* | 3/2015 | Kitano | H01L 27/14663 378/62 |
| 2016/0358458 | A1* | 12/2016 | Kudo | G08B 29/185 |
| 2018/0106914 | A1* | 4/2018 | Morita | G01T 1/17 |

FOREIGN PATENT DOCUMENTS

JP  2005-013272 A  1/2005

* cited by examiner

*Primary Examiner* — Qutbuddin Ghulamali
(74) *Attorney, Agent, or Firm* — Carter, DeLuca & Farrell LLP (57) ABSTRACT

A radiation imaging apparatus includes a radiation detection unit with a pixel array configured to generate a signal according to radiation and a notification unit configured to perform notification by sound production. The radiation imaging apparatus includes: a detection unit configured to detect a plurality of notification events occurring in accordance with a state of the radiation imaging apparatus; and a control unit configured to control the notification by the notification unit based on priority set for each of the plurality of notification events.

21 Claims, 8 Drawing Sheets

| PRIORITY | TYPE OF NOTIFICATION EVENT | TYPE OF MELODY | SOUND PRODUCTION TIME |
|---|---|---|---|
| 1 | START OF IMAGING PROCESSING | MELODY 1 | T1 |
| 2 | IRRADIATION SENSABLE TIME IS SHORT | MELODY 2 | T2 |
| 3 | START OF SENSING RADIATION IRRADIATION | MELODY 3 | T3 |
| 4 | SWITCHING OF IMAGING MODE | MELODY 4 | T4 |
| 5 | UNTRANSFERRED IMAGE IS PRESENT | MELODY 5 | T5 |
| 6 | VOLUME CHANGE | MELODY 6 | T6 |

RADIATION IMAGING APPARATUS, METHOD OF CONTROLLING RADIATION IMAGING APPARATUS, AND NON-TRANSITORY COMPUTER READABLE STORAGE MEDIUM

BACKGROUND OF THE INVENTION

Field of the Invention

The present invention relates to a radiation imaging apparatus, a method of controlling the radiation imaging apparatus, and a non-transitory computer readable storage medium.

Description of the Related Art

In general, radiation imaging apparatuses or radiation imaging systems including the apparatuses have been commercially available, which irradiate an object with X-rays emitted from a radiation emission source, detect the intensity distributions of the X-rays transmitted through the object, and convert the intensity distributions into an image.

Some radiation imaging apparatuses have a notification function of notifying a user of an operation state thereof. A concrete example of the notification function includes a function using light or a sound. Japanese Patent Laid-Open No. 2005-013272 proposes an X-ray imaging apparatus which implements a notification function by mounting or being connected to a light-emitting part such as an LED or a light bulb, or a sound production part such as a loudspeaker.

When the sound production part is used as the notification function, there is a case in which the user cannot identify a plurality of sounds by notifications, mishearing or missing their sounds when timings, at which a plurality of sounds are produced, overlap. In this case, as a result, the user cannot recognize the state of the radiation imaging apparatus, and re-imaging may be required.

SUMMARY OF THE INVENTION

According to one aspect of the present invention, there is provided a radiation imaging apparatus that includes a radiation detection unit with a pixel array configured to generate a signal according to radiation and a notification unit configured to perform notification by sound production, the apparatus comprising: a detection unit configured to detect a plurality of notification events occurring in accordance with a state of the radiation imaging apparatus; and a control unit configured to control the notification by the notification unit based on priority set for each of the plurality of notification events.

According to another aspect of the present invention, there is provided a method of controlling a radiation imaging apparatus that includes a radiation detection unit with a pixel array configured to generate a signal according to radiation, the method comprising: detecting a plurality of notification events occurring in accordance with a state of the radiation imaging apparatus; and controlling the notification by sound production based on priority set for each of the plurality of notification events.

According to still another aspect of the present invention, there is provided a non-transitory computer readable storage medium storing a program for causing a computer to execute a method of controlling a radiation imaging apparatus that includes a radiation detection unit with a pixel array configured to generate a signal according to radiation, the method comprising: detecting a plurality of notification events occurring in accordance with a state of the radiation imaging apparatus; and controlling the notification by sound production based on priority set for each of the plurality of notification events.

According to the present invention, it becomes possible to reduce mishearing or missing of a sound by a notification.

Further features of the present invention will become apparent from the following description of exemplary embodiments (with reference to the attached drawings).

DESCRIPTION OF THE EMBODIMENTS

An exemplary embodiment of the present invention will be described below in detail with reference to the accompanying drawings. Note that the constituent elements described in the embodiment are merely examples. The technical scope of the present invention is determined by the scope of claims and is not limited by the following individual embodiments. In this specification, radiation is not limited to X-rays and may be, for example, an electromagnetic wave, α-rays, β-rays, γ-rays, or the like.

(Arrangement of Radiation Imaging System 100)

Figure 1:
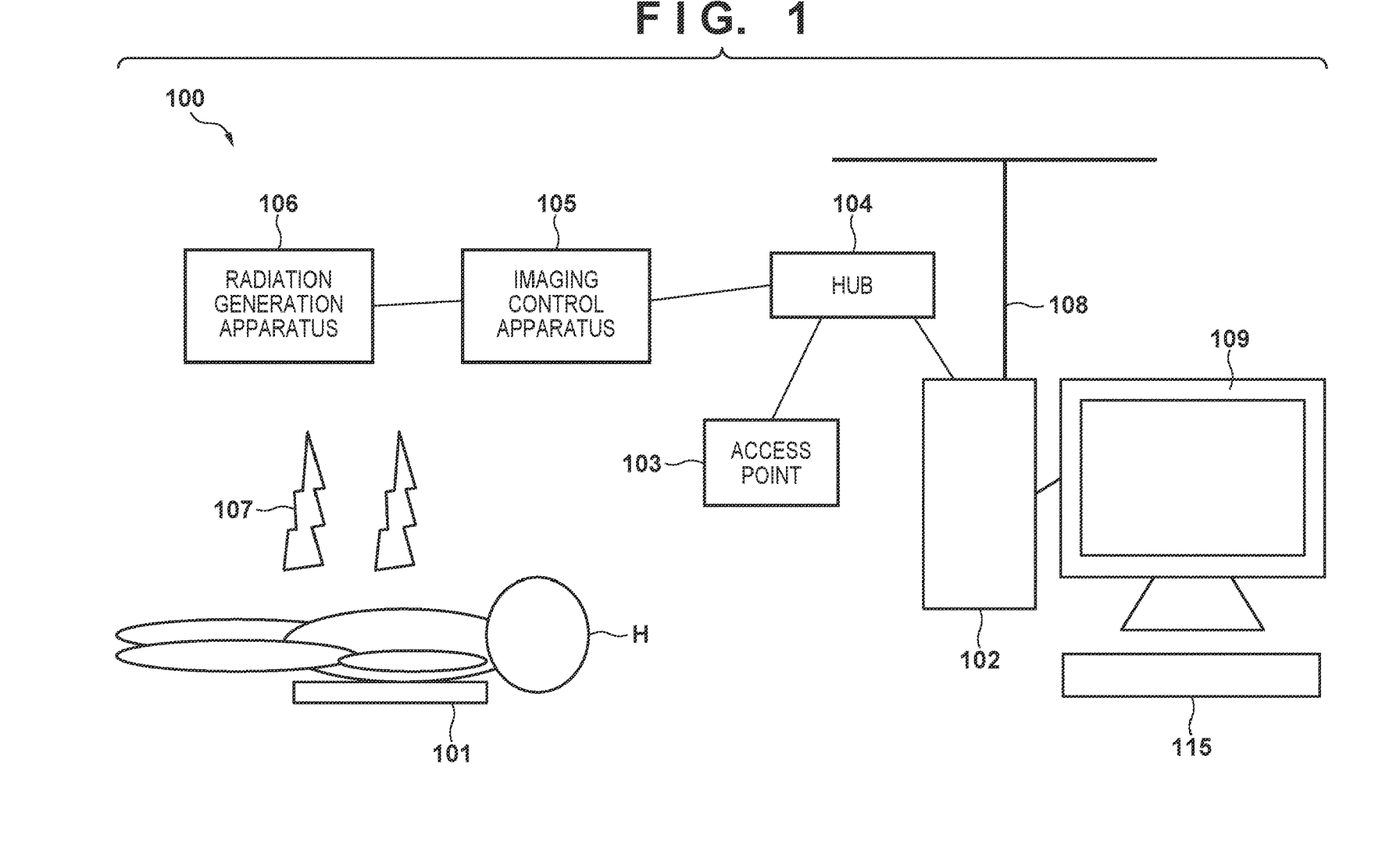
FIG. 1 is a view showing an example of the arrangement of a radiation imaging apparatus according to an embodiment.

FIG. 1 is a view showing an example of the arrangement of a radiation imaging system 100 according to an embodiment. As shown in FIG. 1, the radiation imaging system 100 includes a radiation imaging apparatus 101, an information processing apparatus 102, an access point 103, a HUB 104, an imaging control apparatus 105, and a radiation generation apparatus 106. The radiation imaging apparatus 101 takes a radiation image based on radiation 107 transmitted through an object H. The radiation imaging apparatus 101 is a portable radiation imaging apparatus.

The information processing apparatus 102 can perform display control of displaying the radiation image taken by the radiation imaging apparatus 101 on a display unit 109 of the information processing apparatus 102 and output an imaging instruction based on an imaging mode input via an operation unit 115. The information processing apparatus 102 can also perform image processing on the radiation image taken by the radiation imaging apparatus 101 and display, on the display unit 109, the radiation image that has undergone the image processing.

The access point 103 is a radio wave relay apparatus connected to a wireless communication device. The access point 103 and the radiation imaging apparatus 101 are configured to be communicable with each other by wireless communication. The HUB 104 is a communication connection apparatus which connects a plurality of network devices. The radiation imaging apparatus 101 can be connected to the information processing apparatus 102 via the access point 103 and the HUB 104.

The imaging control apparatus 105 includes a communication circuit using the medium of wireless communication or wired communication. The imaging control apparatus 105 can be connected to the HUB 104, the radiation imaging apparatus 101, and the radiation generation apparatus 106. The imaging control apparatus 105 can also be connected to the information processing apparatus 102 via the HUB 104. The imaging control apparatus 105 obtains, via the communication circuit, information indicating the states of the radiation imaging apparatus 101 and radiation generation apparatus 106, and monitors the state of each apparatus. Moreover, the imaging control apparatus 105 controls the radiation generation apparatus 106 and the radiation imaging apparatus 101 based on the imaging instruction output from the information processing apparatus 102.

For example, in order to generate the radiation 107 such as X-rays, the radiation generation apparatus 106 includes a rotor and radiation tube for accelerating electrons at a high voltage and colliding them against an anode. The radiation generation apparatus 106 performs irradiation with the radiation 107 based on the control of the imaging control apparatus 105. Note that the radiation 107 may be one of the α-rays, the β-rays, the γ-rays, and the X-rays. Based on the control of the imaging control apparatus 105, the radiation imaging apparatus 101 images the object H irradiated with the radiation 107. A LAN 108 is, for example, a local area network established in a hospital. The radiation imaging system 100 can be connected to, via the LAN 108, an RIS (Radiology Information System), an HIS (Hospital Information System), and a PACS (Picture Archiving and Communication System).

In the radiation imaging system 100 shown in FIG. 1, by the control of the imaging control apparatus 105, the radiation generation apparatus 106 performs irradiation with the radiation 107, and the object H as a patient is irradiated with the radiation 107 from the radiation generation apparatus 106. By the control of the imaging control apparatus 105, the radiation imaging apparatus 101 detects the radiation 107 transmitted through the object H at a timing synchronized with irradiation with the radiation 107 and generates a radiation image based on a detection result.

The radiation imaging system 100 can perform imaging by synchronous imaging and asynchronous imaging. Note that synchronous imaging is imaging in which an electrical synchronous signal or the like for making imaging timings coincide with each other between the radiation imaging apparatus 101 and the radiation generation apparatus 106 is exchanged, and coinciding the imaging timings with each other indicates coinciding a radiation irradiation timing by the radiation generation apparatus 106 and a period in which a radiation detection unit 20 of the radiation imaging apparatus 101 accumulates charges with each other. Asynchronous imaging is imaging in which the imaging control apparatus 105 is not provided, the synchronous signal is not exchanged between the radiation imaging apparatus 101 and the radiation generation apparatus 106, and the radiation imaging apparatus 101 itself senses incident radiation and starts accumulating the charges.

The radiation imaging apparatus 101 includes, for example, radiation detection pixels in the arrangement of a pixel array for detecting the radiation 107. The radiation detection unit 20 (FIG. 2) formed by the pixel array starts obtaining a radiation image based on sensing of irradiated radiation. When the radiation 107 is emitted from the radiation generation apparatus 106, the radiation detection unit 20 of the radiation imaging apparatus 101 can operate in an automatic detection mode of automatically accumulating an image signal (charges) to generate the radiation image based on a detection result of the radiation detection pixels.

In the arrangement of the radiation imaging system 100, even if the imaging control apparatus 105 is not provided, the radiation imaging apparatus 101 can operate in the automatic detection mode of automatically accumulating the image signal (charges) to generate the radiation image when the radiation 107 is emitted from the radiation generation apparatus 106. In asynchronous imaging, the radiation imaging apparatus 101 may transfer a radiation image to the information processing apparatus 102 for each imaging or may store the radiation image in an image storage unit 19 without transferring it for each imaging.

In the arrangement of the radiation imaging apparatus 101 of this embodiment, when a notification event detection unit 14 (FIG. 2) detects that the radiation image is stored in the image storage unit 19 without being transferred, a control unit 13 may control a notification unit 12 to produce a sound in order to notify a user (a photographer or an operator) of this. When the notification event detection unit 14 senses that the image storage unit 19 stores the predetermined number (predetermined storage capacity) of untransferred image data, and a storage capacity at which the image storage unit 19 can store image data approaches an upper limit, the control unit 13 may control the notification unit 12 to produce a sound in order to notify the user of this. The radiation imaging apparatus 101 notifies the user based on a predetermined notification event, making it possible to, for example, restrain him/her from forgetting about a transfer operation from the radiation imaging apparatus 101 to the information processing apparatus 102. It is also possible, by notifying the user in advance that the storage capacity at which the image storage unit 19 can store images approaches the upper limit, to suppress an image storing operation in a state in which the storage capacity of the image storage unit 19 is exceeded. That is, it becomes possible to certainly store the radiation images in the image storage unit 19 within the storage capacity of the image storage unit 19.

The radiation imaging system 100 can perform imaging in a plurality of imaging modes. Note that the plurality of imaging modes include at least the first imaging mode, the second imaging mode, and the third imaging mode.

The first imaging mode is the imaging mode of the radiation imaging apparatus 101 by synchronous imaging. The first imaging mode is an imaging mode of performing imaging in a state in which communication between the radiation imaging apparatus 101 and the information processing apparatus 102 is enabled by wired or wireless communication. In the first imaging mode, the information processing apparatus 102 exchanges the electrical synchronous signal or the like for making imaging timings coincide with each other between the radiation imaging apparatus 101 and the radiation generation apparatus 106 in the arrangement of the radiation imaging system 100, performing imaging by a cooperative operation between the radiation imaging apparatus 101 and the radiation generation apparatus 106.

The second imaging mode is the imaging mode of the radiation imaging apparatus 101 by asynchronous imaging. The second imaging mode is an imaging mode of transferring a radiation image to the information processing apparatus 102 for each imaging. The second imaging mode is an imaging mode of performing imaging in the state in which the communication between the radiation imaging apparatus 101 and the information processing apparatus 102 is enabled by wired or wireless communication. In the second imaging mode, when the imaging control apparatus 105 is not provided, a synchronous signal is not exchanged between the radiation imaging apparatus 101 and the radiation generation apparatus 106, and the radiation imaging apparatus 101 itself senses incident radiation in the arrangement of the radiation imaging system 100, the radiation imaging apparatus 101 automatically accumulates an image signal (charges) to generate a radiation image and transfers the radiation image generated for each imaging to the information processing apparatus 102. In the first imaging mode and the second imaging mode, the radiation imaging apparatus 101 performs control for transferring the obtained radiation image to the information processing apparatus 102 for each imaging. The information processing apparatus 102 can display the transferred radiation images on the display unit 109.

The third imaging mode is the imaging mode of the radiation imaging apparatus 101 by asynchronous imaging. The third imaging mode is an imaging mode of not transferring the radiation image for each imaging. The third imaging mode is, for example, an imaging mode of performing imaging in a state in which the communication between the radiation imaging apparatus 101 and the information processing apparatus 102 is not enabled by the wired or wireless communication. The radiation imaging apparatus 101 can accumulate the obtained radiation images in the image storage unit 19 without transferring the radiation images to the information processing apparatus 102 for each imaging and collectively transfer the radiation images stored in the image storage unit 19 to the information processing apparatus 102, for example, at a communicable predetermined timing. In the third imaging mode, the radiation imaging apparatus 101 can perform imaging even if the imaging control apparatus 105, the information processing apparatus 102, the access point 103, and the HUB 104 do not exist in the arrangement of the radiation imaging system 100. That is, it is possible to take the plurality of radiation images collectively in a state in which the radiation imaging apparatus 101 is independent of the information processing apparatus 102 and the like.

In this case, the radiation imaging apparatus 101 alone can obtain the radiation image even if the radiation imaging apparatus 101 and the information processing apparatus 102 do not communicate information on the image or imaging protocol for each imaging. It becomes possible for the radiation imaging apparatus 101 to perform imaging efficiently by storing the radiation image in the image storage unit 19 without communicating with the information processing apparatus 102 for each imaging.

(Arrangement of Radiation Imaging Apparatus 101)

Figure 2:
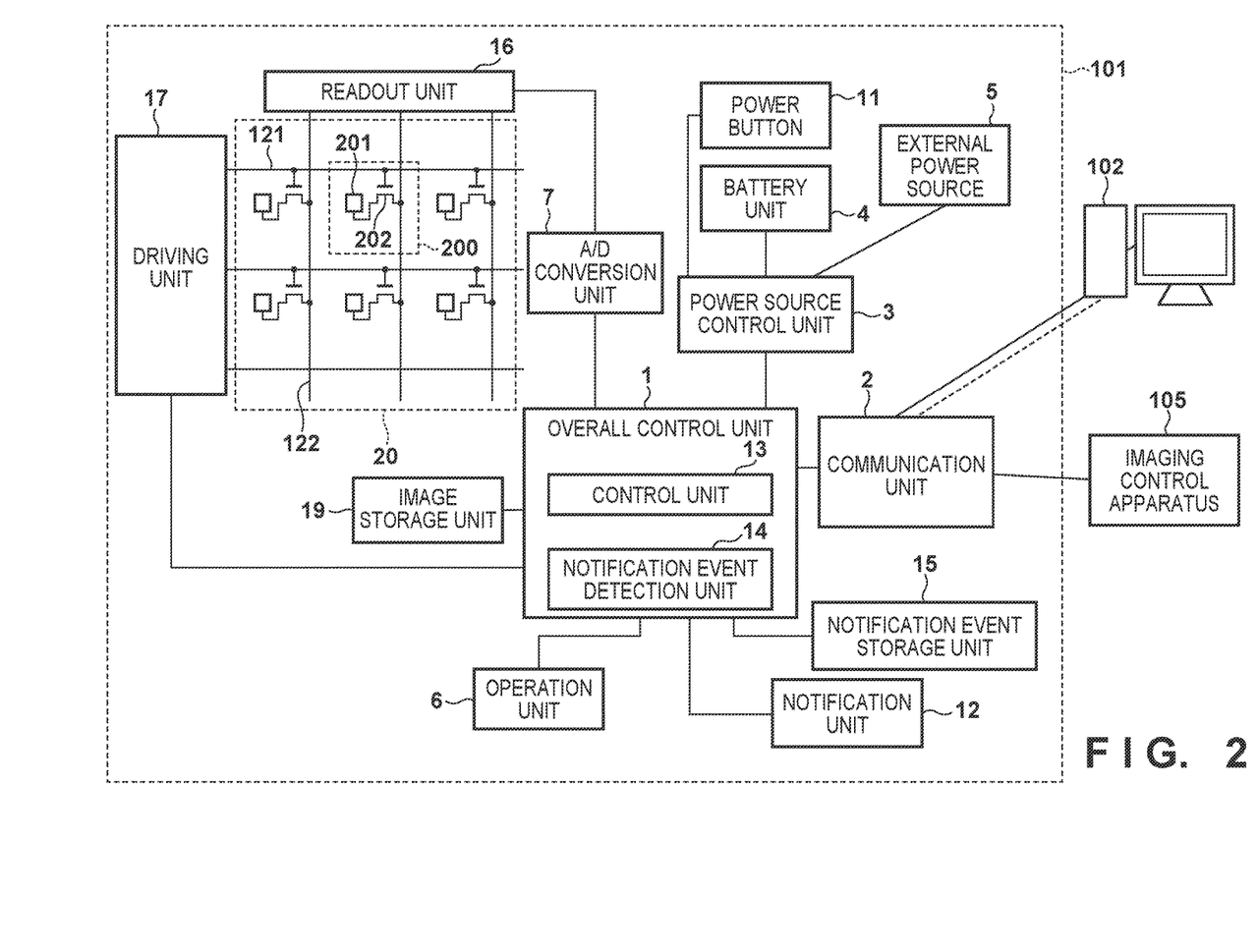
FIG. 2 is a block diagram showing the schematic arrangement of the radiation imaging apparatus.

FIG. 2 is a block diagram showing an example of the arrangement of the radiation imaging apparatus 101 according to this embodiment. The radiation imaging apparatus 101 includes the radiation detection unit 20 with the pixel array for generating a signal according to radiation and the notification unit 12 which makes a notification by sound production. The radiation detection unit 20 detects the radiation 107 transmitted through the object H as an image signal (charges). As shown in FIG. 2, pixels 200 each outputting a signal according to incident light are arranged in an array (two-dimensional region) in the radiation detection unit 20. A photoelectric converter of each pixel 200 converts light converted by a scintillator into an image signal (charges) as an electrical signal, and the capacitor of each pixel 200 accumulates charges. As described above, the radiation detection unit 20 is configured to detect the radiation 107 transmitted through the object H and obtain the image signal (charges).

As shown in FIG. 2, a driving unit 17 supplies, in accordance with an instruction from an overall control unit 1, driving signals to the pixels 200 for each row via a signal line 121. When the driving unit 17 supplies the driving signals to the pixels 200 in a certain row, switch elements 202 of the pixels 200 are gradually set in an ON state, and the image signals (charges) converted by the photoelectric converters are accumulated. In accordance with an instruction from the overall control unit 1, a readout unit 16 reads out, for each column, the image signals (charges) output from the pixels 200 to signal lines 122. The readout unit 16 outputs, to the overall control unit 1, the image signals (charges) read out from the pixels 200 via an analog/digital (A/D) conversion unit 7 (to be referred to as the A/D conversion unit 7 hereinafter).

The A/D conversion unit 7 converts an analog image signal read out from each pixel 200 by the readout unit 16 into a digital image signal and outputs the converted digital image signal to the overall control unit 1. The overall control unit 1 functions as a control unit which controls the operation of the radiation imaging apparatus 101 as a whole and generates a radiation image from the digital image signal. The overall control unit 1 can store the generated radiation image in the image storage unit 19. For example, when the radiation imaging apparatus 101 is connected to the information processing apparatus 102 by wired communication or wireless communication, the overall control unit 1 can obtain the radiation image stored in the image storage unit 19 and transmit it to the information processing apparatus 102 via a communication unit 2. The information processing apparatus 102 can accumulate and process information received from the radiation imaging apparatus 101. The information processing apparatus 102 can also perform display control of displaying the information received from the radiation imaging apparatus 101 on the display unit 109 of the information processing apparatus 102.

An operation unit 6 is used to accept an operation setting for performing imaging. A method of mounting the operation unit 6 is not particularly limited, and the operation unit 6 can be configured to accept an input from the user. More specifically, the operation unit 6 can be implemented by various switches, touch panel, or the like manually operated by the user. Note that an operation for performing imaging includes, for example, an operation of starting power supply to each component that forms the radiation imaging apparatus, a mode switching operation of performing imaging while communicating with the information processing apparatus 102, or the like. The notification event detection unit 14 detects the operation of the operation unit 6 and notifies the control unit 13 of occurrence of a notification event regarding the state of the radiation imaging apparatus 101.

The communication unit 2 can communicate with the information processing apparatus 102 and the imaging control apparatus 105 by wired communication or wireless communication. In FIG. 2, solid lines between the communication unit 2, and the information processing apparatus 102 and the imaging control apparatus 105 indicate the wired communication, and a broken line indicates the wireless communication. The communication unit 2 can also perform wireless communication with the access point 103 shown in FIG. 1.

A power source control unit 3 converts voltages from a battery unit 4 and an external power source 5 into a predetermined voltage, and controls voltage supply (power supply) to each component of the radiation imaging apparatus 101. The power source control unit 3 can control voltage supply (power supply) from the battery unit 4 or the external power source 5 and monitor the remaining battery level of the battery unit 4. The battery unit 4 can supply a predetermined voltage from a battery based on the control of the power source control unit 3 and supply, via the power source control unit 3, the predetermined voltage to each unit of the radiation imaging apparatus 101. The battery unit 4 can be formed by using, for example, a Li-Ion battery and an electric double layer capacitor. The external power source 5 can supply a predetermined voltage from an external power source and supply, via the power source control unit 3, the predetermined voltage to each unit of the radiation imaging apparatus 101.

A power button 11 is an operation unit configured to switch between the start and stop of voltage supply from a power source. For example, if the external power source 5 is not connected, it is possible, by operating the power button 11, to switch between ON and OFF of voltage supply from the battery unit 4. If the external power source 5 is connected, it is possible, by operating the power button 11, to switch between ON and OFF of voltage supply from the external power source 5. The power button 11 can be arranged by, for example, the functions of a device, control circuit, and program that start and stop power supply to each component of the radiation imaging apparatus 101. The power button 11 is provided, for example, on the side surface of the radiation imaging apparatus 101. However, the power button 11 may be arranged on any surface of a housing of the radiation imaging apparatus 101 except for a surface in the incident direction of the radiation 107. Note that switching between ON and OFF of voltage supply is not performed by operating the power button 11 and, for example, the power source control unit 3 may switch between ON and OFF of voltage supply from the external power source 5 based on whether the external power source 5 is connected.

The notification unit 12 notifies the user of occurrence of a notification event. The notification unit 12 includes, for example, a unit of making a notification (sound production) by a sound wave of a loudspeaker or the like, an oscillation such as a vibration, or the like. The user can recognize the state of the radiation imaging apparatus 101 by recognizing notification information from the notification unit 12. The notification unit 12 is provided, for example, on the side surface of the radiation imaging apparatus 101. However, the notification unit 12 may be arranged on any surface of the housing of the radiation imaging apparatus 101 except for the surface in the incident direction of the radiation 107.

Note that the state of the radiation imaging apparatus 101 may include, for example, a state switched to one of the first imaging mode, the second imaging mode, and the third imaging mode. The state of the radiation imaging apparatus 101 may also include a state in which a physical quantity such as a volume of sound production from the notification unit 12 is changed. Switching of the imaging mode and a change in physical quantity such as volume can be performed by a change operation (for example, double click) via the power button 11 or a change operation via an operation unit different from the power button 11 such as the operation unit 6. Switching of the imaging mode and the change in physical quantity such as volume can also be performed with an operation by the wireless communication or wired communication between the radiation imaging apparatus 101 and the information processing apparatus 102.

The overall control unit 1 includes, as functional components, the notification event detection unit 14 which detects a plurality of notification events occurring in accordance with the state of the radiation imaging apparatus and the control unit 13 which controls a notification by the notification unit 12 based on priority set for each of the plurality of notification events. The functions of the respective units of these functional components are configured by using, for example, programs loaded from a CPU (central processing unit) (not shown) and a memory. The respective units of the control unit 13 and notification event detection unit 14 may be formed by integrated circuits or the like as long as their configurations accomplish the same functions.

The notification event detection unit 14 of the overall control unit 1 has a function of detecting a notification event occurring by the state of the radiation imaging apparatus. When the notification event detection unit 14 detects the notification event occurring by the state (state change) of the radiation imaging apparatus 101, the notification event detection unit 14 notifies the control unit 13 of the detected notification event. For example, the notification event detection unit 14 detects an interrupt signal of a program in the overall control unit 1 and notifies the control unit 13 of this. The control unit 13 judges, by analyzing an interrupt factor, the notification event that has occurred and controls the notification unit 12 in accordance with information such as priority stored in a notification event storage unit 15. The configuration of the notification event detection unit 14 is not limited to this example, and may be implemented with a process by software, for example, a reference to an electrical signal (HIGH/LOW) such as GPIO (General Purpose Input/Output), or detection of a notification event with an event flag provided by an OS (Operating System) or the like.

The notification event storage unit 15 has a function of storing the notification event detected by the notification event detection unit 14 under the control of the control unit 13. The notification event storage unit 15 can be formed by a device capable of reading and writing, and it is possible to use, for example, a nonvolatile memory such as a flash memory. The notification event storage unit 15 may be formed by, for example, a volatile storage device such as an SDRAM (Synchronous Dynamic Random Access Memory).

Figure 3A:
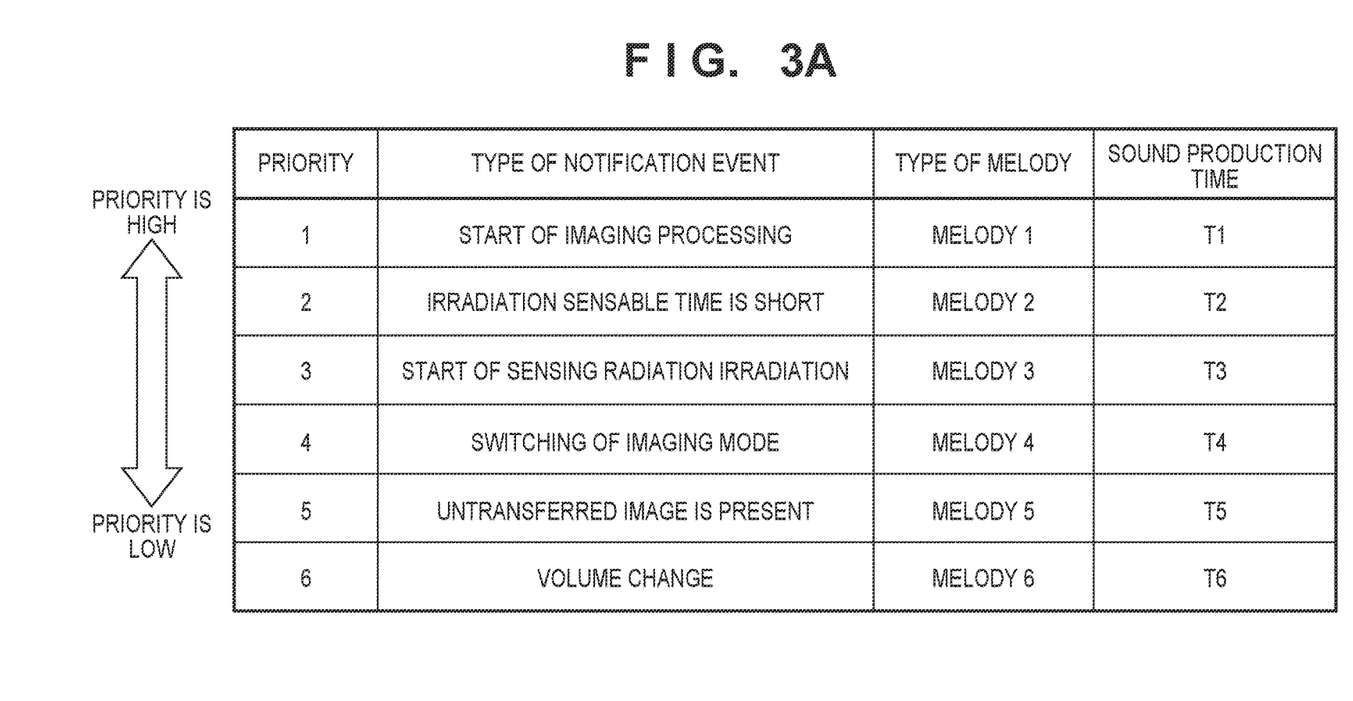
FIG. 3A is a table showing an example of notification events.

FIG. 3A is a table showing an example of notification events. A state in which radiation imaging processing is started (start of imaging processing), a state in which an irradiation sensable time for sensing radiation irradiation is smaller than a reference value, the start of sensing radiation irradiation, switching of the imaging mode, a state in which image data that is not transferred to an external apparatus (such as the information processing apparatus 102) exists (an untransferred image is present), a volume change, and the like are set as the types of notification events. The types of notification events are not limited to these examples and also include, for example, a state in which the setting of the radiation imaging apparatus 101 based on an operation setting by the operation unit 6 is changed.

Priority, the types of melodies (melodies 1, 2, . . . ), sound production times (T1, T2 . . . ), and the like are associated with the respective types of notification events. The notification event storage unit 15 can store, for example, the types of notification events, the types of sound production (types of melodies), priority corresponding to each notification event, and the like, as shown in FIG. 3A. Note that a method of storing and holding the priority and the like is not limited to the notification event storage unit 15, and the method of storing and holding the priority and the like can be set in advance in a control program or ROM (not shown) of the control unit 13. Note that the priority is information for judging, for example, whether sound production should be performed immediately on a notification event, or a specific notification event to produce a sound for preferentially when another notification event occurs simultaneously.

The control unit 13 can specify, by referring to the setting or the like in the ROM or the control program in the notification event storage unit 15 or the control unit 13, the priority, the types of sound production (types of melodies), and the like associated with the notification events detected by the notification event detection unit 14 and control the notification unit 12 based on a specified result. The control unit 13 can control the notification unit 12 so as to produce a sound (melody) corresponding to each notification event in stored time series with regard to the plurality of notification events stored in the notification event storage unit 15.

Alternatively, the control unit 13 can control sound production of the notification unit 12 based on the priority of the plurality of notification events stored in the notification event storage unit 15. If the plurality of notification events occur, the control unit 13 determines the priority of each notification event and controls the notification unit 12 based on a priority determination result. Based on the priority of each notification event, the control unit 13 can perform sound production control of the sound production order, sound production interval, sound production volumes, sound production times, and the like of the notification events. For example, if the plurality of events occur simultaneously or a timing at which sound production periods overlap, the control unit 13 can perform, based on the priority set in the respective notification events, the sound production control of the notification unit 12 so as to generate sound production (melody) corresponding to each notification event.

By allocating the priority depending on the type of notification event and associating a melody (including a parameter regarding a sound such as the frequency of sound production, the length of a sound, an attenuation method, or the like) with the notification event, when the notification event is detected, the control unit 13 can specify the type (melody) and priority of sound production corresponding to the detected notification event, and perform sound production control so as to cause the notification unit 12 to produce the melody.

It is possible to set the priority so as to, for example, increase the priority of a notification event regarding a process while imaging such as an event in which the radiation imaging apparatus 101 senses irradiation with the radiation 107. This makes it easier for the user to quickly and precisely grasp the state of the radiation imaging apparatus 101 when there is a high possibility that radiation can be generated. In addition to this, as a priority setting example, it is possible to set high priority for a notification event which urges a caution or attention on the user and set, for a notification event such as an input confirmation, priority lower than that of the notification event which urges the caution or the attention.

Figure 3B:
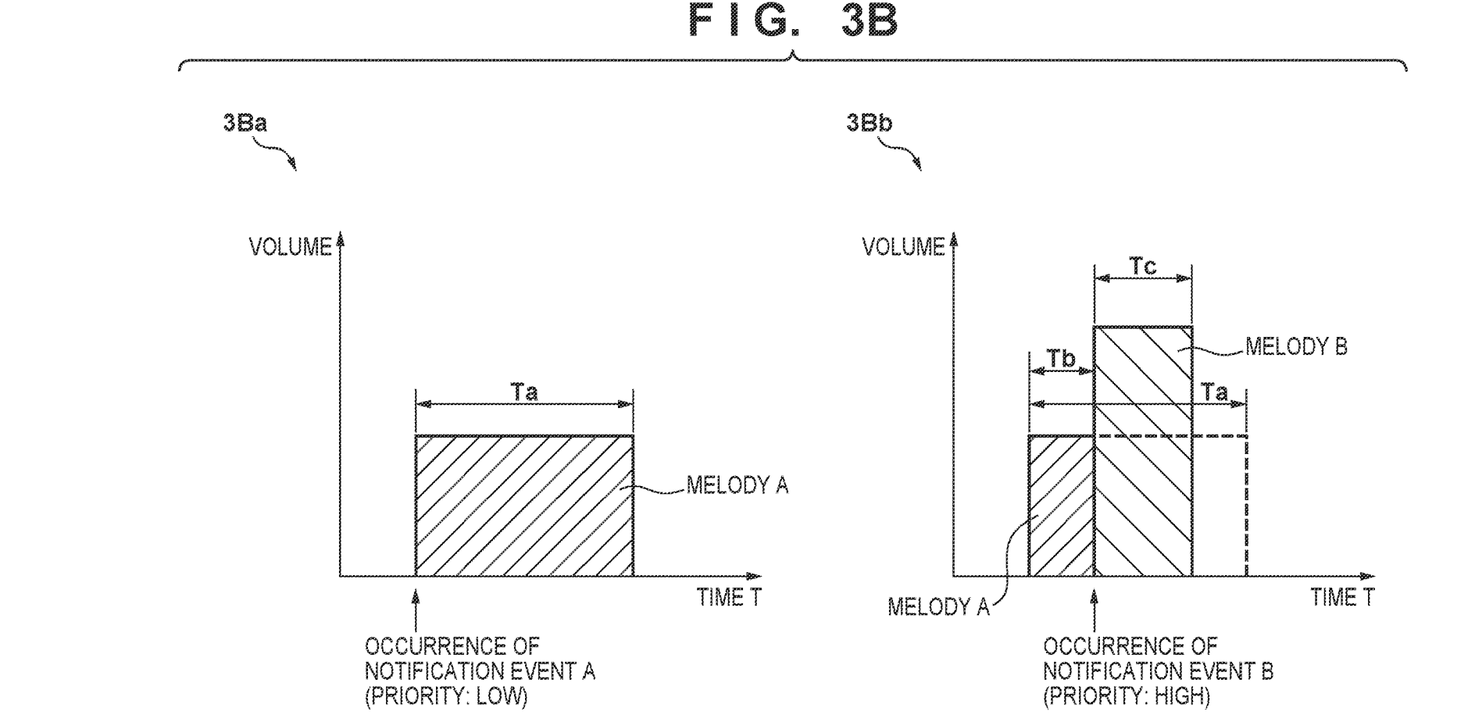
FIG. 3B shows graphs for exemplarily explaining sound production control.

FIG. 3B shows graphs for exemplarily explaining sound production control by the control unit 13. The abscissa indicates a lapse of time, and the ordinate exemplarily indicates the sound production volumes of melodies. Note that it is possible to use, as parameters of the ordinate, the frequencies of the melodies instead of the sound production volumes. While the control unit 13 produces the first sound (melody A) associated with a notification event from the notification unit 12, if a notification event higher in priority than the notification event is detected, the control unit 13 controls the notification unit 12 so as to make a sound production time to produce the first sound (melody A) shorter than a preset sound production time. That is, the control unit 13 controls the notification unit 12 so as to finish producing the first sound (melody A) in the middle of the preset sound production time and produce the second sound (melody B) associated with the notification event of high priority.

In an example shown in 3Ba of FIG. 3B, a state is shown in which notification event A of a low-priority setting occurs, and the notification unit 12 produces melody A. Let Ta be a sound production time of melody A corresponding to notification event A in normal times. In an example shown in 3Bb of FIG. 3B, a state is shown in which at a timing Tb in the middle of producing melody A, notification event B higher in priority setting than notification event A occurs, and the notification unit 12 produces melody B. Let Tc be a sound production time of melody B corresponding to notification event B in normal times. While the sound (melody A) for the notification event (notification event A) of low priority is produced from the notification unit 12, if the notification event (notification event B) higher in priority than notification event A occurs, the control unit 13 controls the notification unit 12 so as to finish producing the sound (melody A) for notification event A of low priority in midstream (Tb), and switch over to and produce the sound (melody B) for notification event B of high priority. After a lapse of the sound production time Tc of melody B, melody A corresponding to notification event A is not produced from the notification unit 12, terminating the sound production control by the control unit 13.

Figure 3C:
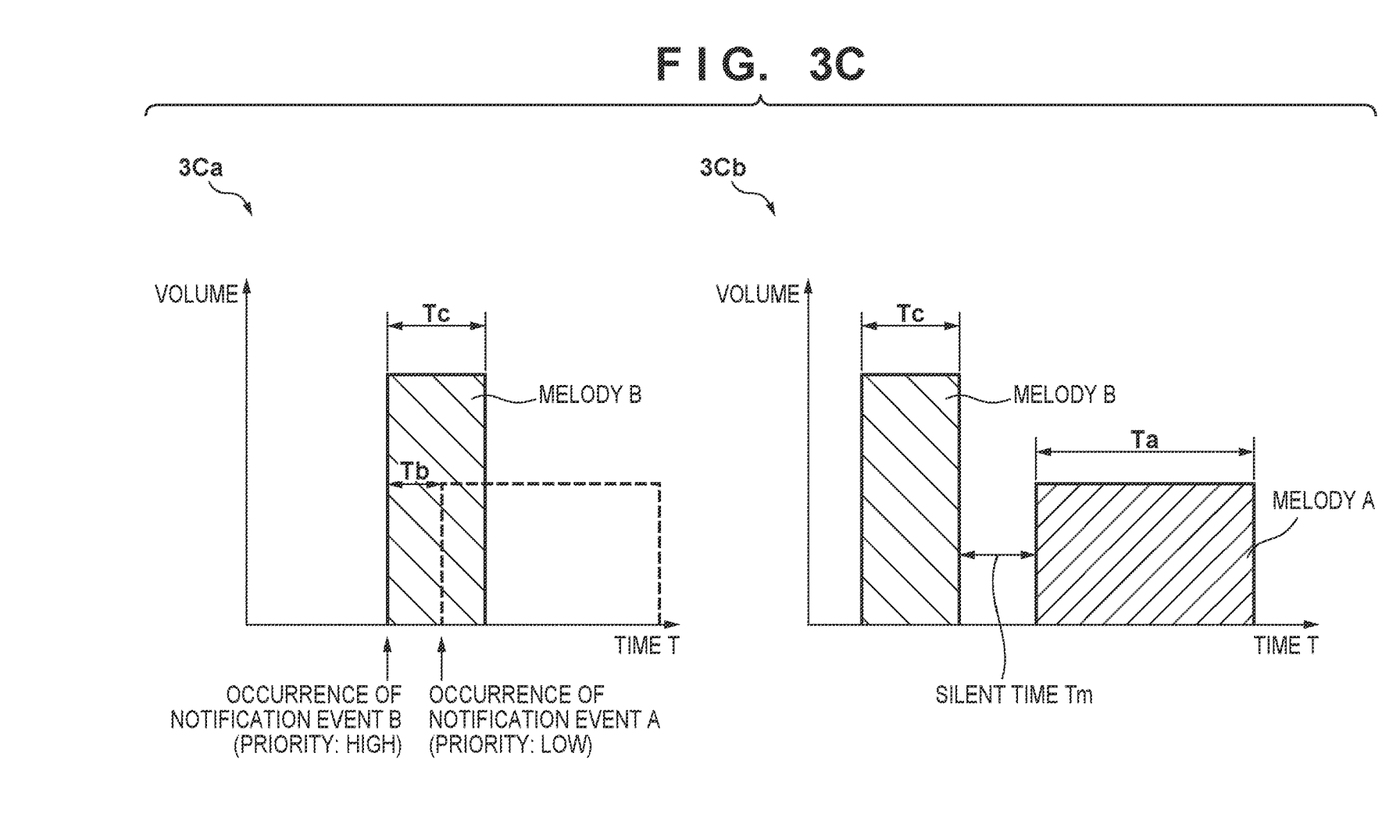
FIG. 3C shows graphs for exemplarily explaining sound production control.

FIG. 3C shows graphs for exemplarily explaining sound production control by the control unit 13. As in FIG. 3B, the abscissa indicates a lapse of time, and the ordinate exemplarily indicates the sound production volumes of melodies. It is possible to use, as parameters of the ordinate, the frequencies of the melodies instead of the sound production volumes. While the control unit 13 produces the first sound (melody A) associated with a notification event from the notification unit 12, if a notification event lower in priority than the notification event is detected, the control unit 13 controls the notification unit 12 so as to produce the second sound (melody B) associated with the notification event of low priority after producing the first sound (melody A) from the notification unit 12 for a preset sound production time. The control unit 13 controls the notification unit 12 to silence after the completion of sound production of the first sound (melody A) and before the start of sound production of the second sound (melody B).

In an example shown in 3Ca of FIG. 3C, a state is shown in which notification event B of a high-priority setting occurs, and the notification unit 12 produces melody B. Let Tc be a sound production time of melody B corresponding to notification event B in normal times. 3Ca of FIG. 3C shows a state in which notification event A lower in priority setting than notification event B occurs at the timing Tb in the middle of producing melody B. Even if notification event A of the low-priority setting occurs in the middle of producing melody B, the control unit 13 controls the notification unit 12 so as to produce melody B until the sound production time Tc in normal times without finishing producing it in midstream. If the notification event of low priority is detected while producing melody B from the notification unit 12, the control unit 13 stores notification event A of low priority in the notification event storage unit 15.

In an example shown in 3Cb of FIG. 3C, a silent period Tm is set after the end of sound production of melody B. After a lapse of the silent period Tm, the control unit 13 controls the notification unit 12 so as to obtain notification event A stored in the notification event storage unit and produce melody A associated with obtained notification event A. Let Ta be the sound production time of melody A corresponding to notification event A in normal times. After the end of sound production of melody A, the sound production control by the control unit 13 ends.

As shown in FIG. 3C, while the sound (melody B) for the notification event (notification event B) of high priority is produced from the notification unit 12, if the notification event (notification event A) lower in priority than notification event B occurs, the control unit 13 controls the notification unit 12 so as to switch over to and produce the sound (melody A) for notification event A of low priority after melody B for notification event B of high priority ends. In this case, the control unit 13 controls the notification unit 12 so as to switch over to and produce the sound (melody A) for notification event A of low priority after producing the sound (melody B) for notification event B of high priority from the notification unit 12 for the preset sound production time Tc without finishing producing it in midstream. When switching from high priority to low priority, the control unit 13 controls the notification unit 12 to silence for about a time (silent time Tm) capable of allowing the user to recognize silence, and then switch over to the sound (melody A) for notification event A of low priority after the completion of sound production (after the lapse of the sound production time Tc) for notification event B of high priority by the notification unit 12. The control unit 13 can change the silent time (Tm) in accordance with the type of notification event B of high priority. Alternatively, the control unit 13 can change the silent time (Tm) based on the combination of notification event B of high priority and notification event A of low priority.

According to the sound production control for switching from sound production (melody) for the notification event of low priority to sound production (melody) of the notification event of high priority (FIG. 3B), the user can hear sound production (melody) of high priority immediately and confirm occurrence of the notification event of high priority as soon as possible. According to the sound production control for switching from sound production (melody) for the notification event of high priority to sound production (melody) of the notification event of low priority (FIG. 3C), it is possible, by providing the silent time, to clearly distinguish between sound production for the notification event of high priority and sound production for the notification event of low priority, both of which are performed from the notification unit 12. It becomes possible, by changing a setting for the silent time based on the type of notification event B of high priority or the combination of the notification events (B, A, and the like), to enhance an effect of recognizing the notification event by the user.

When the readout unit 16 reads out, in accordance with the instruction from the overall control unit 1, the image signals (charges) output from the pixels 200 to the signal lines 122, in order to avoid sound production during a readout period, the control unit 13 can also perform control so as to delay the start of sound production by storing a notification event detected during the readout period in the notification event storage unit 15. The readout period is a period in which the very small amount of charges needed to generate an image is extracted. In order to avoid receiving the influence of electromagnetism generated by, for example, driving a coil in a sound production unit (loudspeaker) of the notification unit 12, the control unit 13 sets a period (sound production restricted period) in which sound production is restricted (prohibited) during the readout period by the readout unit 16 and performs control so as to restrict sound production from the notification unit 12. That is, if the notification event detection unit 14 detects a notification event during a readout period in which signals are read out from the pixel array, the control unit 13 sets the readout period as the sound production restricted period and restricts sound production from the notification unit 12.

The readout period includes a period (time) in which the readout unit 16 reads out the image signal (charges) output from each pixel 200 to a corresponding one of the signal lines 122, and a period (time) in which the A/D conversion unit 7 amplifies and digitizes the analog image signal read out from each pixel 200 by the readout unit 16. That is, the sound production restricted period includes a period in which correction image data and radiation image data are digitized. Note that setting of the sound production restricted period is not limited to this example, and it is also possible to perform control so as to delay the start of sound production by setting the sound production restricted period for a state (notification event) in which noise or an artifact may be caused in an image.

When the radiation imaging apparatus 101 obtains the correction image data and the radiation image data after radiation irradiation in order to generate one image, a readout period for obtaining each image data is set as a sound production restricted period. The correction image data is, for example, an image obtained from the pixel array of the radiation detection unit 20 in a state without radiation irradiation. The control unit 13 can also set the sound production restricted period depending on the imaging mode. For example, when imaging is performed using the information processing apparatus 102 as in the first imaging mode or the second imaging mode, it is possible to perform notification about the state of the radiation imaging apparatus 101 with an arrangement other than sound production by the notification unit 12. If sounds are generated both in the radiation imaging apparatus 101 and the information processing apparatus 102 in accordance with detection of one notification event, this can be duplicate notifications for one notification event. In this case, the control unit 13 can set a sound production restricted period so as to restrict sound production in the radiation imaging apparatus 101.

Figure 4:
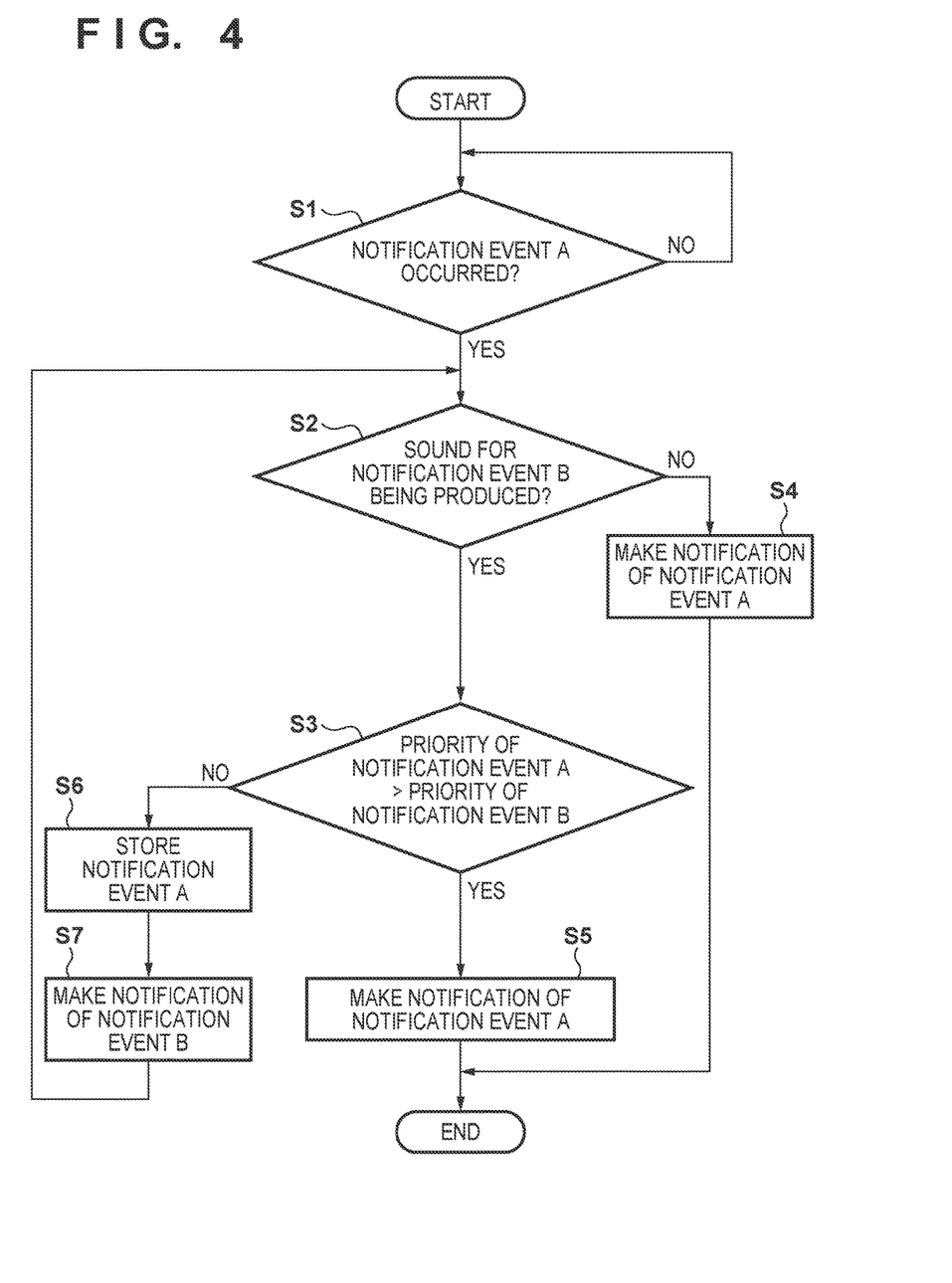
FIG. 4 is a flowchart for explaining the sequence of the sound production control by the radiation imaging apparatus.

Sound production control by the radiation imaging apparatus 101 with the above-described arrangement will now be described with reference to a flowchart of FIG. 4.

First, in step S1, the notification event detection unit 14 monitors occurrence of a notification event and continues monitoring occurrence of the notification event if the notification event does not occur (NO in step S1). On the other hand, if occurrence of the notification event (for example, notification event A of priority A) is detected in step S1 (YES in step S1), the process advances to step S2. The notification event detection unit 14 notifies the control unit 13 of detection of notification event A.

In step S2, the control unit 13 determines whether a sound (melody) based on notification event B of priority setting B is being produced. If the sound (melody) based on notification event B is not being produced (NO in step S2), the process advances to step S4 in which the control unit 13 controls the notification unit so as to produce a sound (melody) based on notification event A (step S4). The processes in NO in step S2 and step S4 correspond to the process described with reference to 3Ba of FIG. 3B.

On the other hand, if it is determined in step S2 that the sound (melody) based on notification event B is being produced (YES in step S2), the process advances to step S3.

In step S3, the control unit 13 compares priorities between notification event A and notification event B detected before notification event A. If notification event A is higher in priority than notification event B (YES in step S3), the process advances to step S5 in which the control unit 13 controls the notification unit 12 so as to produce the sound (melody) based on notification event A (step S5). The processes in YES in step S3 and step S5 correspond to the process described with reference to 3Bb of FIG. 3B.

On the other hand, if it is determined in step S3 that notification event A is lower in priority than notification event B (NO in step S3), the process advances to step S6.

In step S6, under the control of the control unit 13, notification event A is stored in the notification event storage unit 15, and the process advances to step S7. In step S7, the control unit 13 controls the notification unit 12 so as to produce the sound (melody) based on notification event B. Then, the process returns to step S2, and the same process is repeated from step S2. The control unit 13 controls the notification unit 12 so as to produce the sound (melody) based on notification event B until sound production for notification event B of high priority is terminated, and the process advances to step S4 after sound production for notification event B is terminated (NO in step S2). In step S4, the control unit 13 controls the notification unit 12 so as to produce the sound (melody) based on notification event A. Consequently, the notification of notification event A is made. The processes in NO in step S3, steps S6 and S7, NO in step S2, and step S4 correspond to the processes described with reference to 3Ca and 3Cb of FIG. 3C.

Figure 5A:
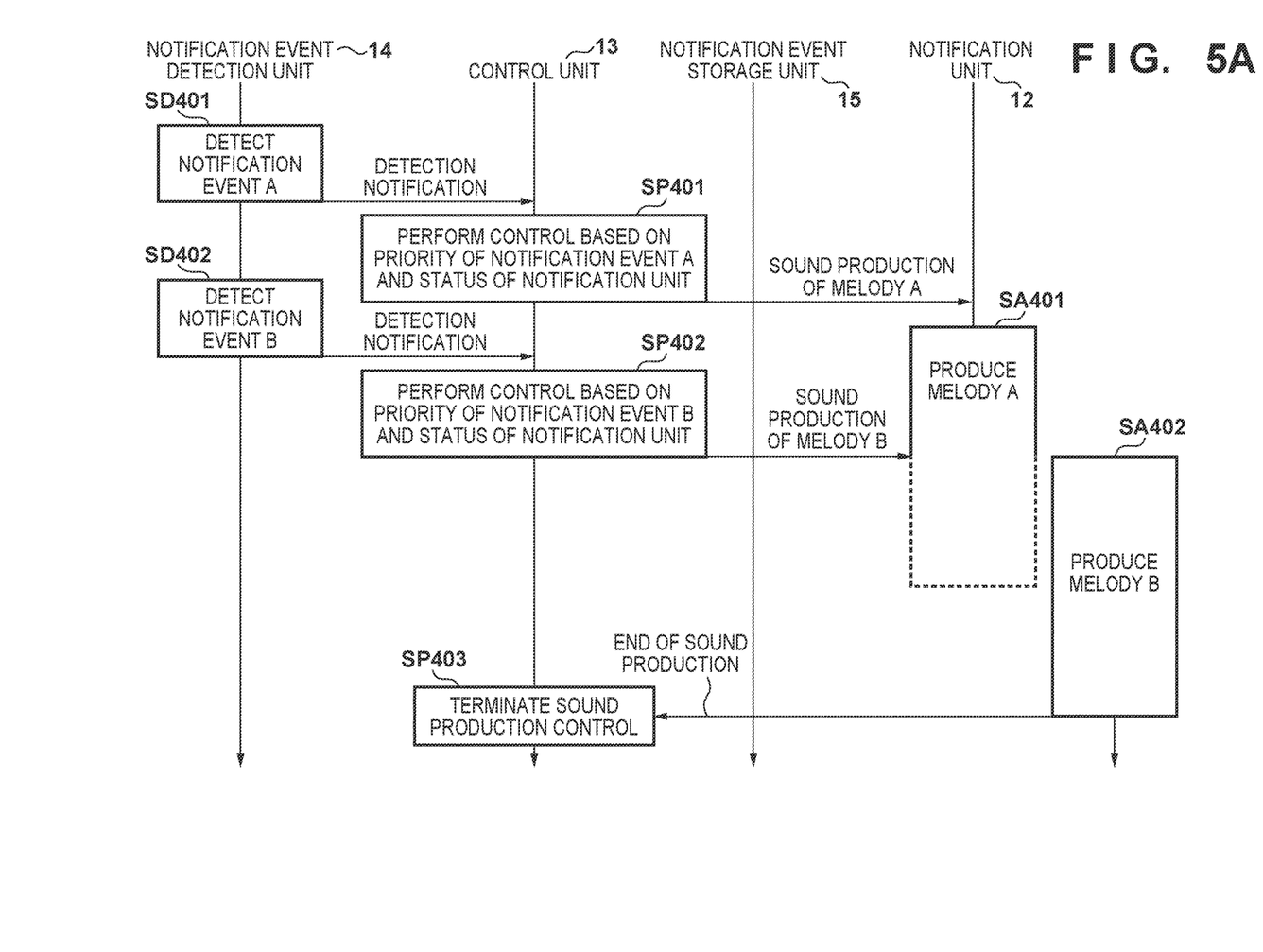
FIG. 5A is a chart showing the sequence of notification processing when a notification event of high priority occurs during sound production for a notification event of low priority.

FIG. 5A is a chart showing the processing sequence of the notification event detection unit 14, control unit 13, notification event storage unit 15, and notification unit 12 in a case in which notification event B higher in priority than notification event A occurs while the sound (melody A) for notification event A of low priority is produced from the notification unit 12. This processing sequence corresponds to the process described with reference to 3Bb of FIG. 3B.

In SD401, the notification event detection unit 14 detects notification event A of low priority and notifies the control unit 13 of occurrence of notification event A.

Then, in SP401, the control unit 13 controls the notification unit 12 so as to produce the sound (melody A) associated with notification event A from information such as the priority of notification event A and the priority of the melody being produced by the notification unit 12. Then, in SA401, the notification unit 12 produces melody A based on the sound production control of the control unit 13.

Then, in SD402, when the notification event detection unit 14 detects notification event B higher in priority than notification event A, it notifies the control unit 13 of occurrence of notification event B.

In SP402, the control unit 13 compares priorities between notification event A associated with melody A being produced and notification event B, and controls the notification unit 12 based on a comparison result. If notification event B higher in priority than notification event A occurs while melody A for notification event A of low priority is produced from the notification unit 12, the control unit 13 controls the notification unit 12 so as to finish producing melody A for notification event A of low priority in midstream, and switch over to and produce melody B for notification event B of high priority.

Then, in SA402, the notification unit 12 produces melody B based on the sound production control of the control unit 13. After the end of sound production of melody B, the control unit 13 terminates the sound production control in SP403.

Figure 5B:
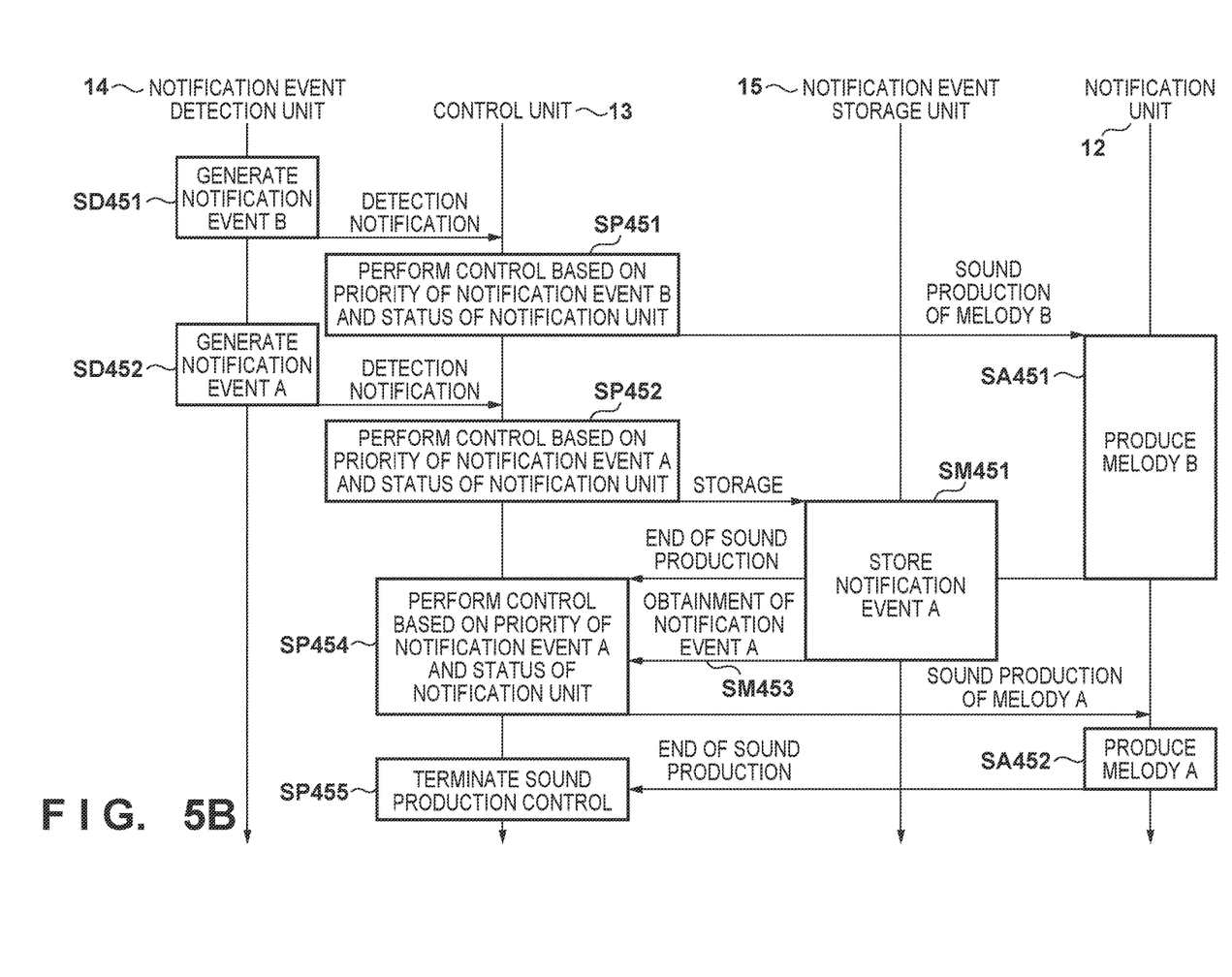
FIG. 5B is a chart showing the sequence of the notification processing when the notification event of low priority occurs during sound production for the notification event of high priority.

FIG. 5B is a chart showing the processing sequence of the notification event detection unit 14, control unit 13, notification event storage unit 15, and notification unit 12 in a case in which notification event A lower in priority than notification event B occurs while the sound (melody B) for notification event B of high priority is produced from the notification unit 12. This processing sequence corresponds to the processes described with reference to 3Ca and 3Cb of FIG. 3C.

In SD451, the notification event detection unit 14 detects notification event B of high priority and notifies the control unit 13 of occurrence of notification event B.

Then, in SP451, the control unit 13 controls the notification unit 12 so as to produce the sound (melody B) associated with notification event B from information such as the priority of notification event B and the priority of the melody being produced by the notification unit 12.

Then, in SA451, the notification unit 12 produces melody B based on the sound production control of the control unit 13.

Then, in SD452, when the notification event detection unit 14 detects notification event A lower in priority than notification event B, it notifies the control unit 13 of occurrence of notification event A.

In SP452, the control unit 13 compares priorities between notification event B associated with melody B being produced and notification event A, and controls the notification unit 12 based on a comparison result.

In SM451, if notification event A is lower in priority than notification event B, information on notification event A of low priority is stored in the notification event storage unit 15 under the control of the control unit 13.

After the end of sound production of melody B, the control unit 13 obtains the information on notification event A stored in the notification event storage unit 15 in SM453, and the control unit 13 controls the notification unit 12 so as to produce melody A associated with notification event A from the information such as the priority of notification event A and the priority of the melody being produced by the notification unit 12 in SP454.

Then, in SA452, the notification unit 12 produces melody A based on the sound production control of the control unit 13. After the end of sound production of melody A, the control unit 13 terminates the sound production control in SP455.

Alternatively, notification events occurring while the melody is produced may be stored in the notification event storage unit 15 by a means such as FIFO, or the control unit 13 can perform control so as to change the order of the notification events in the notification event storage unit 15 based on priority and perform sound production from the notification unit 12.

According to this embodiment, it becomes possible to reduce mishearing or missing of a sound by a notification. This allows the user to recognize the state of the radiation imaging apparatus 101 accurately. This makes it possible to reduce a labor such as re-imaging, suppress ineffective exposure of an object, and perform radiation imaging efficiently.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-203029, filed Oct. 14, 2016, which is hereby incorporated by reference herein in its entirety.

What is claimed is:

1. A radiation imaging apparatus that includes a radiation detection unit with a pixel array configured to generate a signal according to radiation and a notification unit configured to perform notification by sound production, the apparatus comprising:
 a detection unit configured to detect a notification event occurring in accordance with a state of the radiation imaging apparatus; and
 a control unit configured to control the notification by the notification unit to produce a sound associated with the notification event of high priority corresponding to each of a plurality of notification events, when the detection unit detects the plurality of notification events.

2. The apparatus according to claim 1, wherein while the control unit produces a first sound associated with a notification event from the notification unit, if a notification event higher in priority than the notification event is detected,
 the control unit controls the notification unit so as to make a sound production time to produce the first sound shorter than a preset sound production time.

3. The apparatus according to claim 2, wherein the control unit controls the notification unit so as to finish producing the first sound in the middle of the preset sound production time and produce a second sound associated with the notification event of high priority.

4. The apparatus according to claim 1, wherein while the control unit produces a first sound associated with a notification event from the notification unit, if a notification event lower in priority than the notification event is detected,
 the control unit controls the notification unit so as to produce a second sound associated with the notification event of low priority after the first sound is produced from the notification unit for a preset sound production time.

5. The apparatus according to claim 4, wherein the control unit controls the notification unit to silence after completion of sound production of the first sound and before a start of sound production of the second sound.

6. The apparatus according to claim 5, wherein based on a type of the notification event associated with the first sound, the control unit changes a setting of a silent time to set the notification unit to silence.

7. The apparatus according to claim 5, wherein based on a combination of a type of the notification event associated with the first sound and a type of the notification event associated with the second sound, the control unit changes a setting of a silent time to set the notification unit to silence.

8. The apparatus according to claim 4, further comprising a storage unit configured to store notification event information,
 wherein if the notification event of low priority is detected while the first sound is produced from the notification unit, the control unit stores information on the notification event of low priority in the storage unit.

9. The apparatus according to claim 8, wherein after completion of sound production of the first sound, the control unit controls the notification unit so as to obtain the notification event information stored in the storage unit and produce the second sound associated with the obtained notification event information.

10. The apparatus according to claim 1, wherein if the detection unit detects a notification event during a readout period in which a signal is read out from the pixel array, the control unit sets the readout period as a sound production restricted period and restricts sound production from the notification unit.

11. The apparatus according to claim 10, wherein in a period in which the signal is read out from the pixel array includes a period in which an image signal is read out from the pixel array in order to obtain correction image data in a state without radiation irradiation and radiation image data after radiation irradiation.

12. The apparatus according to claim 11, wherein the sound production restricted period includes a period in which the correction image data and the radiation image data are digitized.

13. The apparatus according to claim 1, wherein the state of the radiation imaging apparatus includes a state in which radiation imaging processing is started.

14. The apparatus according to claim 1, wherein the state of the radiation imaging apparatus includes a state in which an irradiation sensing time for sensing radiation irradiation is smaller than a reference value.

15. The apparatus according to claim 1, further comprising an image storage unit configured to store image data, wherein the state of the radiation imaging apparatus includes a state in which image data that is stored in the image storage unit and is not transferred to an external apparatus exists.

16. The apparatus according to claim 1, further comprising an operation unit configured to accept an operation setting for performing imaging,
wherein the state of the radiation imaging apparatus includes a state in which a setting of the radiation imaging apparatus based on the operation setting by the operation unit is changed.

17. The apparatus according to claim 1, wherein the state of the radiation imaging apparatus includes a state in which an imaging mode of the radiation imaging apparatus is changed.

18. The apparatus according to claim 1, wherein while the control unit controls the notification unit so as to produce a first sound associated with a first notification event, if a second notification event higher in priority than the first notification event is detected, the control unit controls the notification unit so as to finish producing the first sound and to produce a second sound associated with the second notification event.

19. A method of controlling a radiation imaging apparatus that includes a radiation detection unit with a pixel array configured to generate a signal according to radiation, the method comprising:
detecting a notification event occurring in accordance with a state of the radiation imaging apparatus; and
controlling the notification by sound production to produce a sound associated with the notification event of high priority corresponding to each of a plurality of notification events, when a detection unit detects the plurality of notification events.

20. A non-transitory computer readable storage medium storing a program for causing a computer to execute a method of controlling a radiation imaging apparatus that includes a radiation detection unit with a pixel array configured to generate a signal according to radiation, the method comprising:
detecting a notification event occurring in accordance with a state of the radiation imaging apparatus; and
controlling the notification by sound production to produce a sound associated with the notification event of high priority corresponding to each of a plurality of notification events, when a detection unit detects the plurality of notification events.

21. A radiation imaging apparatus that includes a radiation detection unit with a pixel array configured to generate a signal according to radiation and a notification unit configured to perform notification by sound production, the apparatus comprising:
a detection unit configured to detect a notification event occurring in accordance with a state of the radiation imaging apparatus; and
a control unit configured to control the notification by the notification unit based on priority set for each of the plurality of the notification events, wherein if the detection unit detects a notification event of the plurality of the notification events during a readout period in which a signal is read out from the pixel array, the control unit restricts sound production from the notification unit.

* * * * *